Oct. 23, 1951        D. H. HESTER        2,572,148
PHOTOGRAPHIC PRINT DRYING AND MOUNTING APPARATUS
Filed July 29, 1949        10 Sheets-Sheet 1
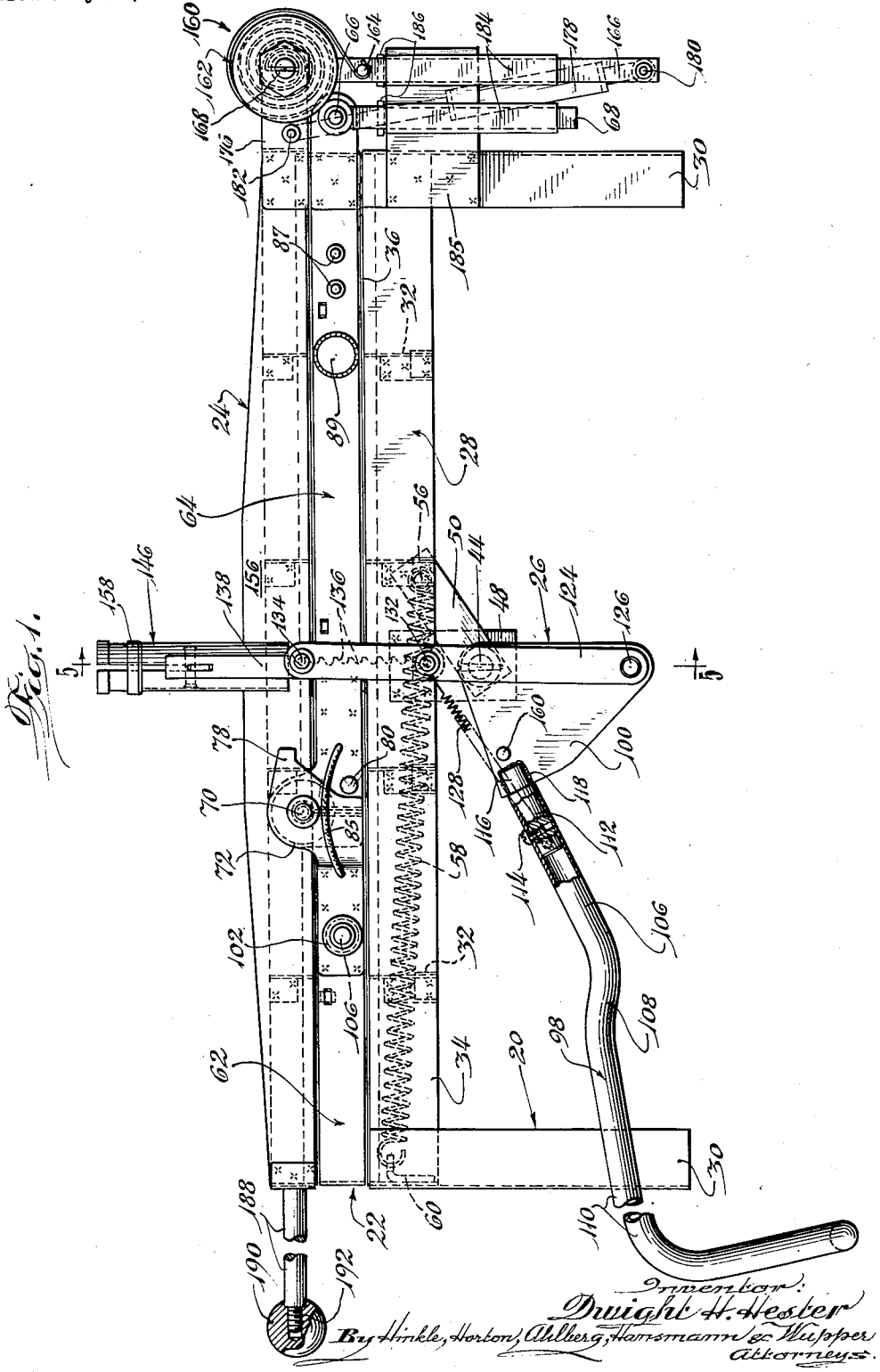

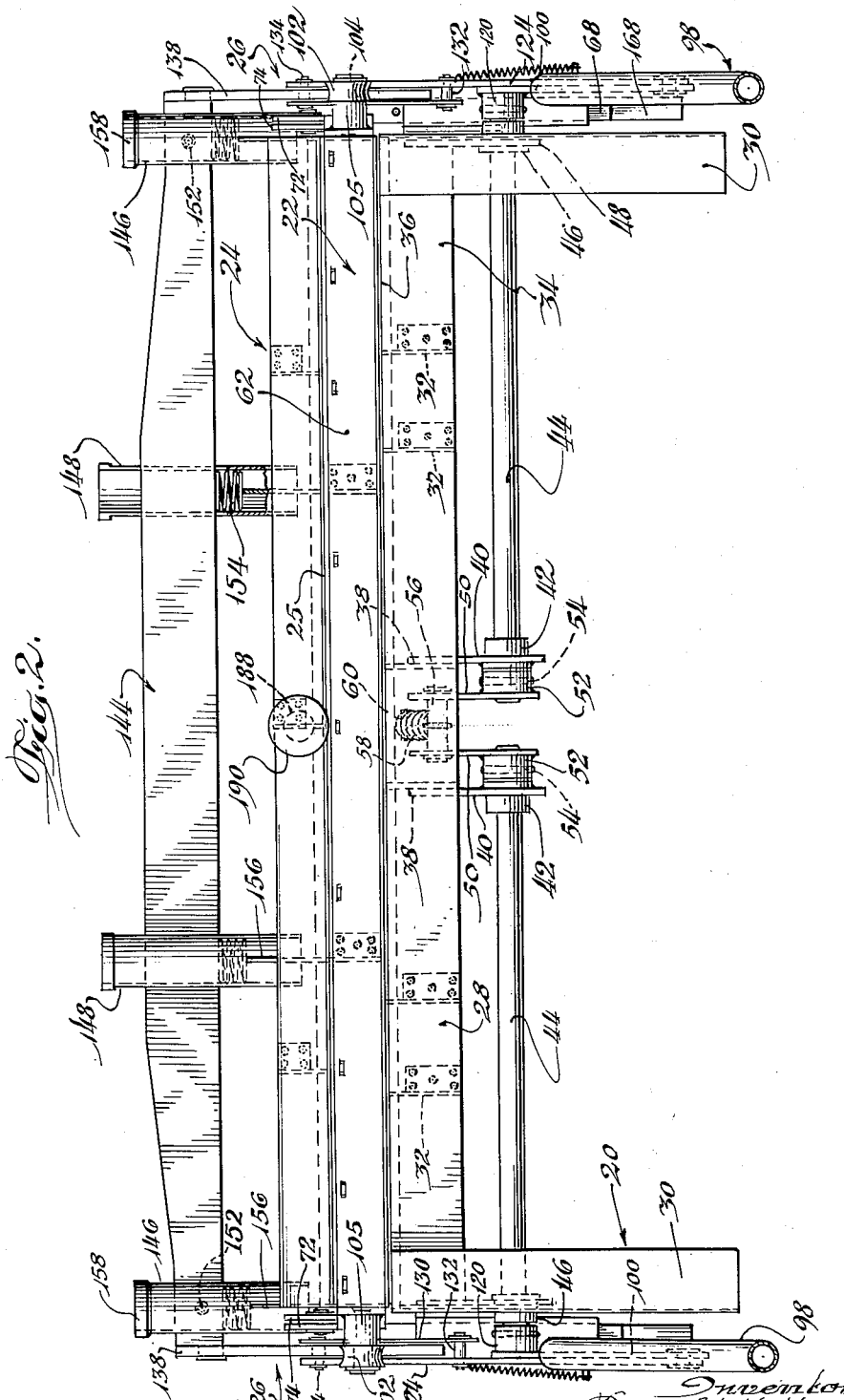

Oct. 23, 1951     D. H. HESTER     2,572,148
PHOTOGRAPHIC PRINT DRYING AND MOUNTING APPARATUS
Filed July 29, 1949     10 Sheets-Sheet 3
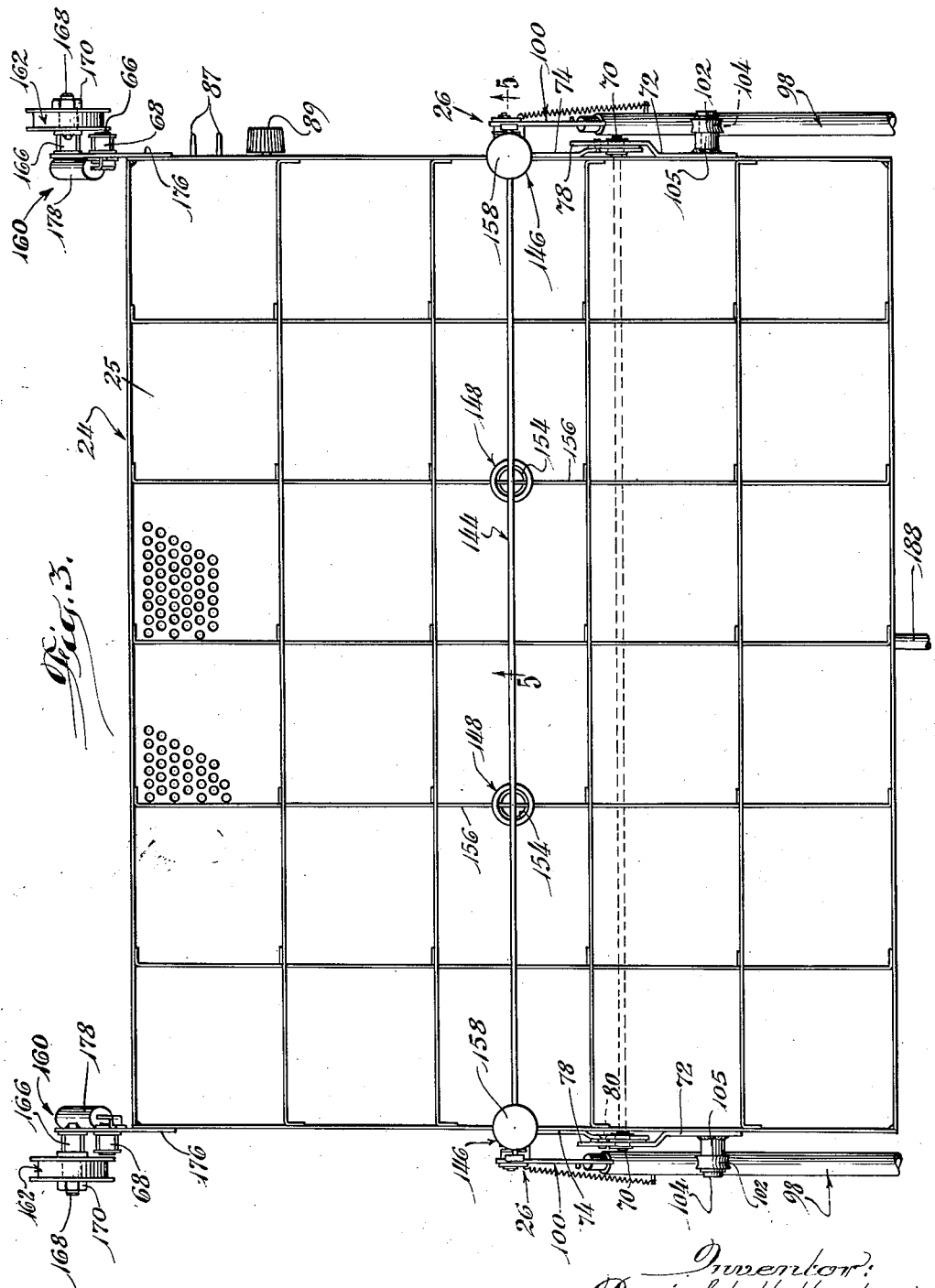

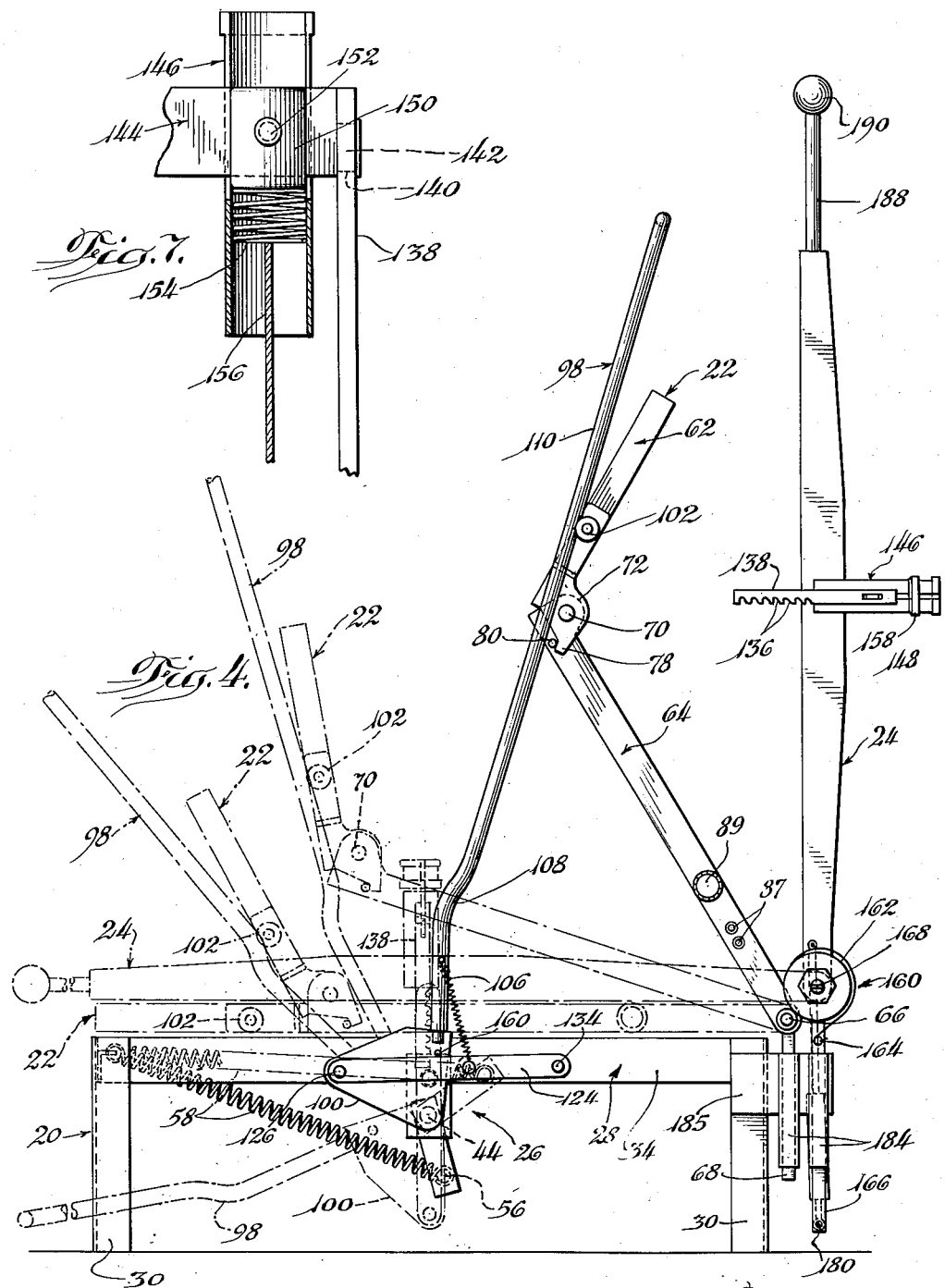

Oct. 23, 1951     D. H. HESTER     2,572,148
PHOTOGRAPHIC PRINT DRYING AND MOUNTING APPARATUS
Filed July 29, 1949     10 Sheets-Sheet 5
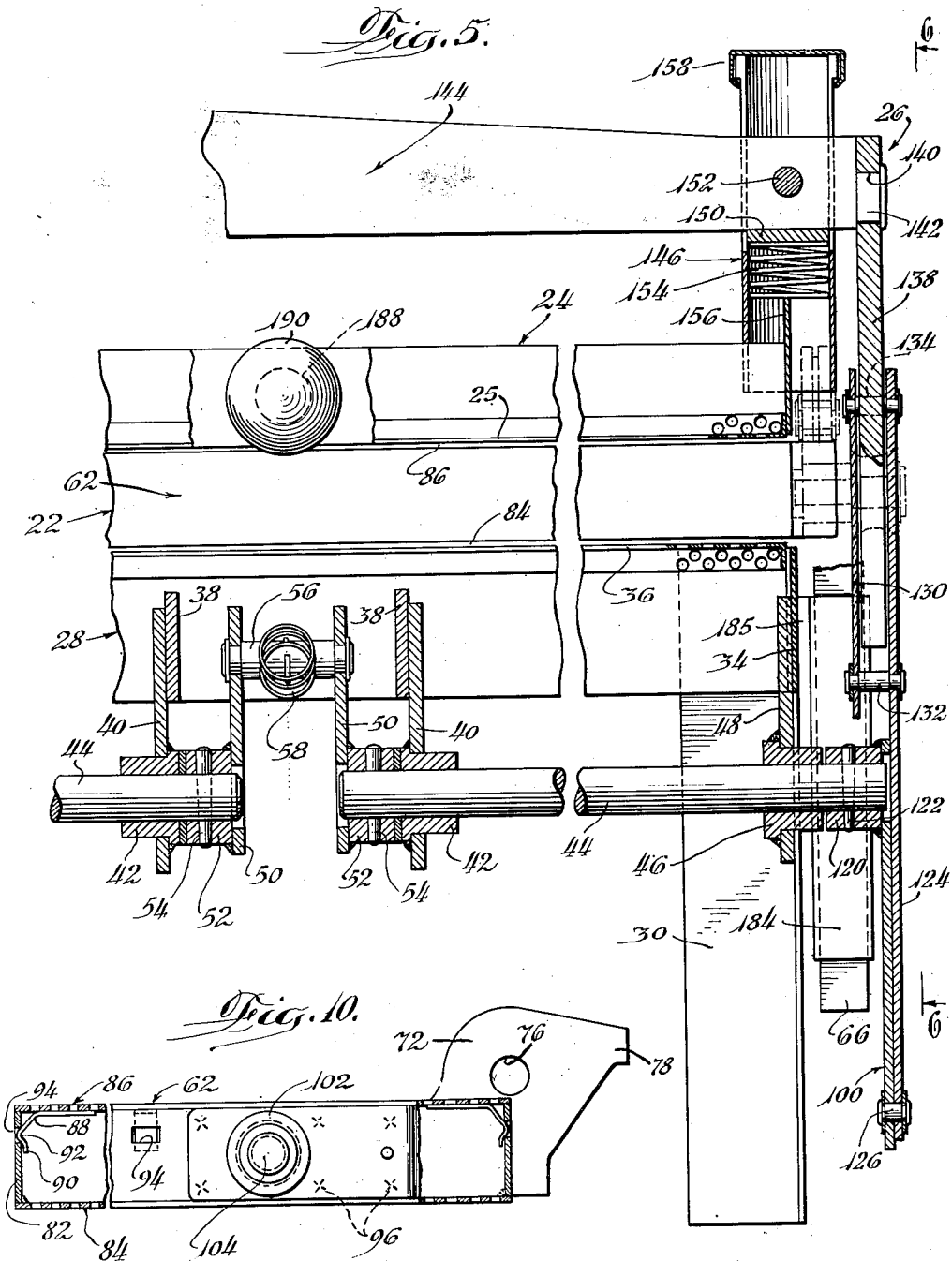
Inventor:
Dwight H. Hester
By Hinkle, Horton, Ahlberg, Harrismann & Tupper
Attorneys.

Oct. 23, 1951 — D. H. HESTER — 2,572,148
PHOTOGRAPHIC PRINT DRYING AND MOUNTING APPARATUS
Filed July 29, 1949 — 10 Sheets-Sheet 6
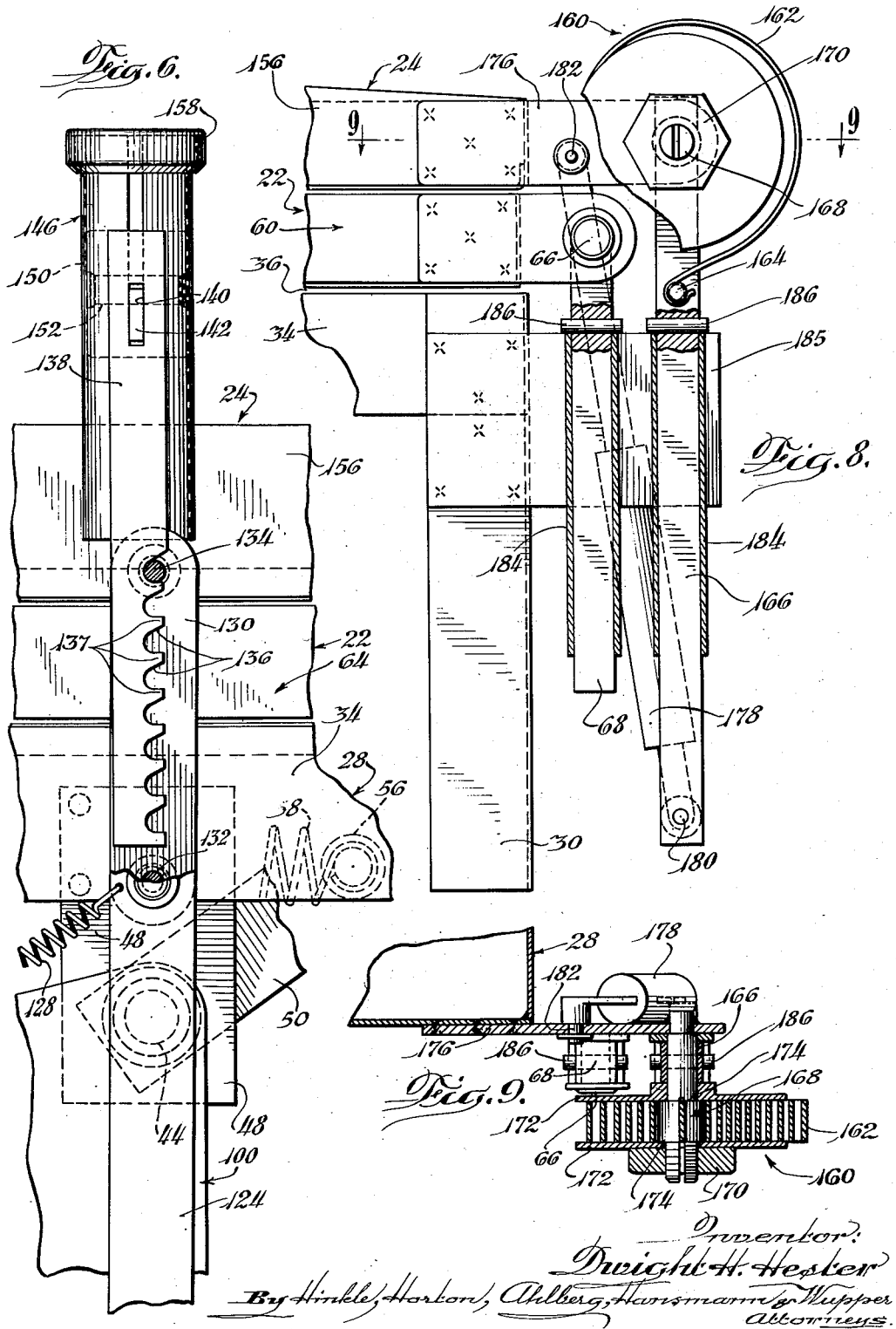

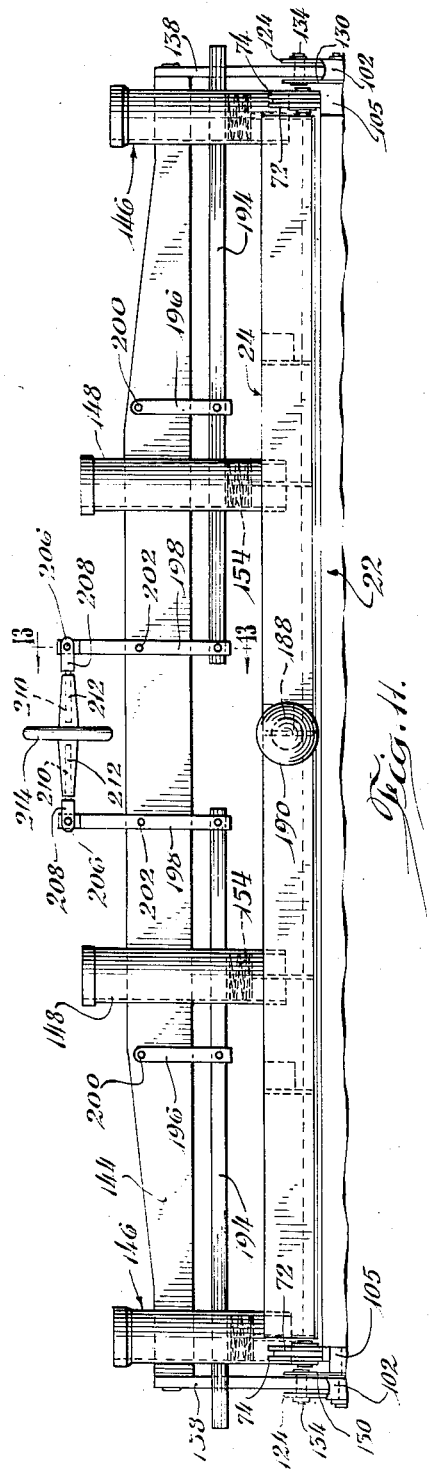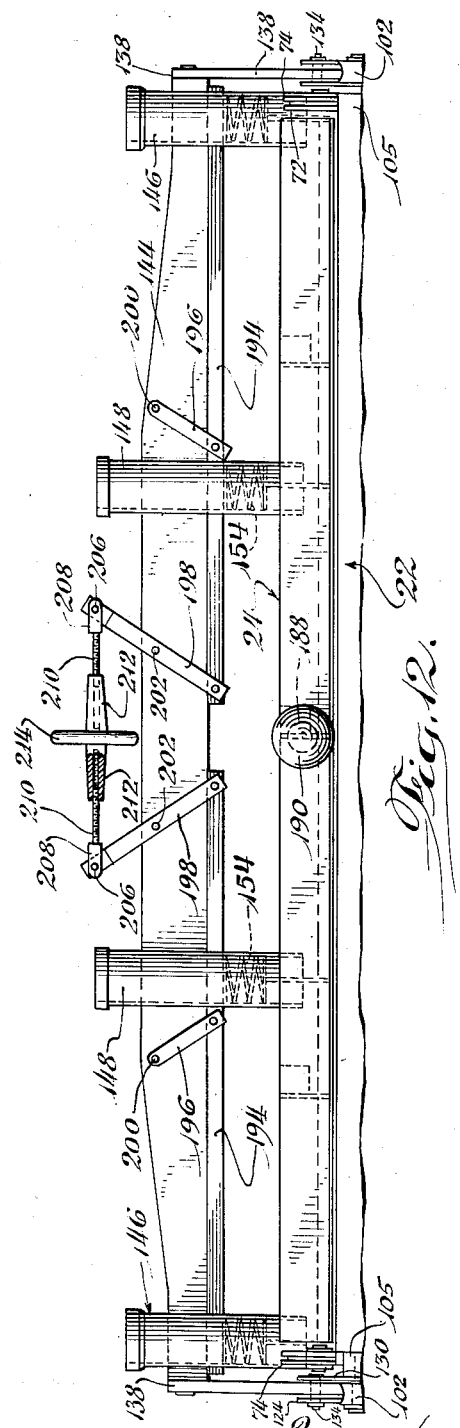

Oct. 23, 1951         D. H. HESTER         2,572,148
PHOTOGRAPHIC PRINT DRYING AND MOUNTING APPARATUS
Filed July 29, 1949         10 Sheets-Sheet 8
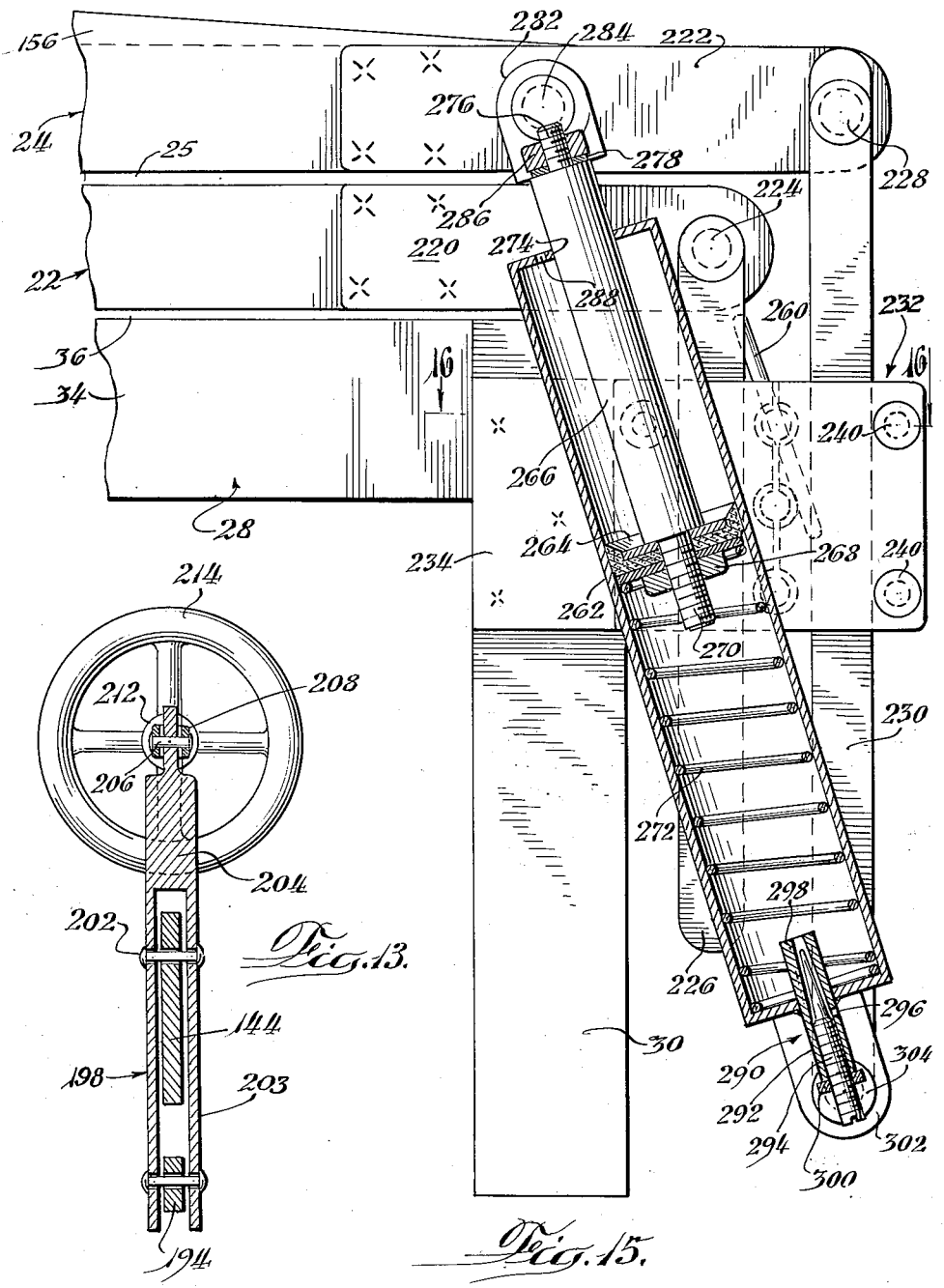

Oct. 23, 1951 D. H. HESTER 2,572,148
PHOTOGRAPHIC PRINT DRYING AND MOUNTING APPARATUS
Filed July 29, 1949 10 Sheets-Sheet 9
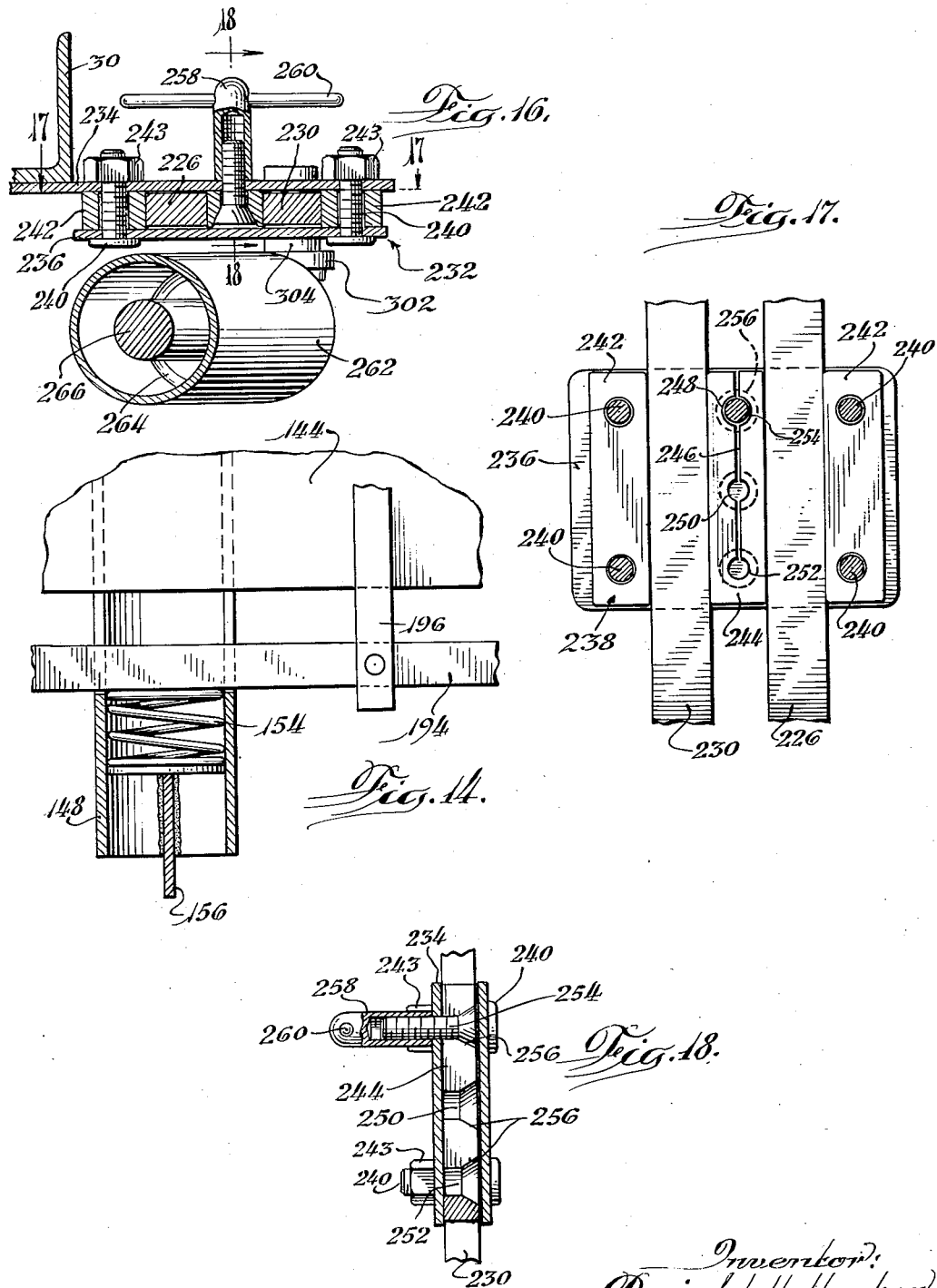

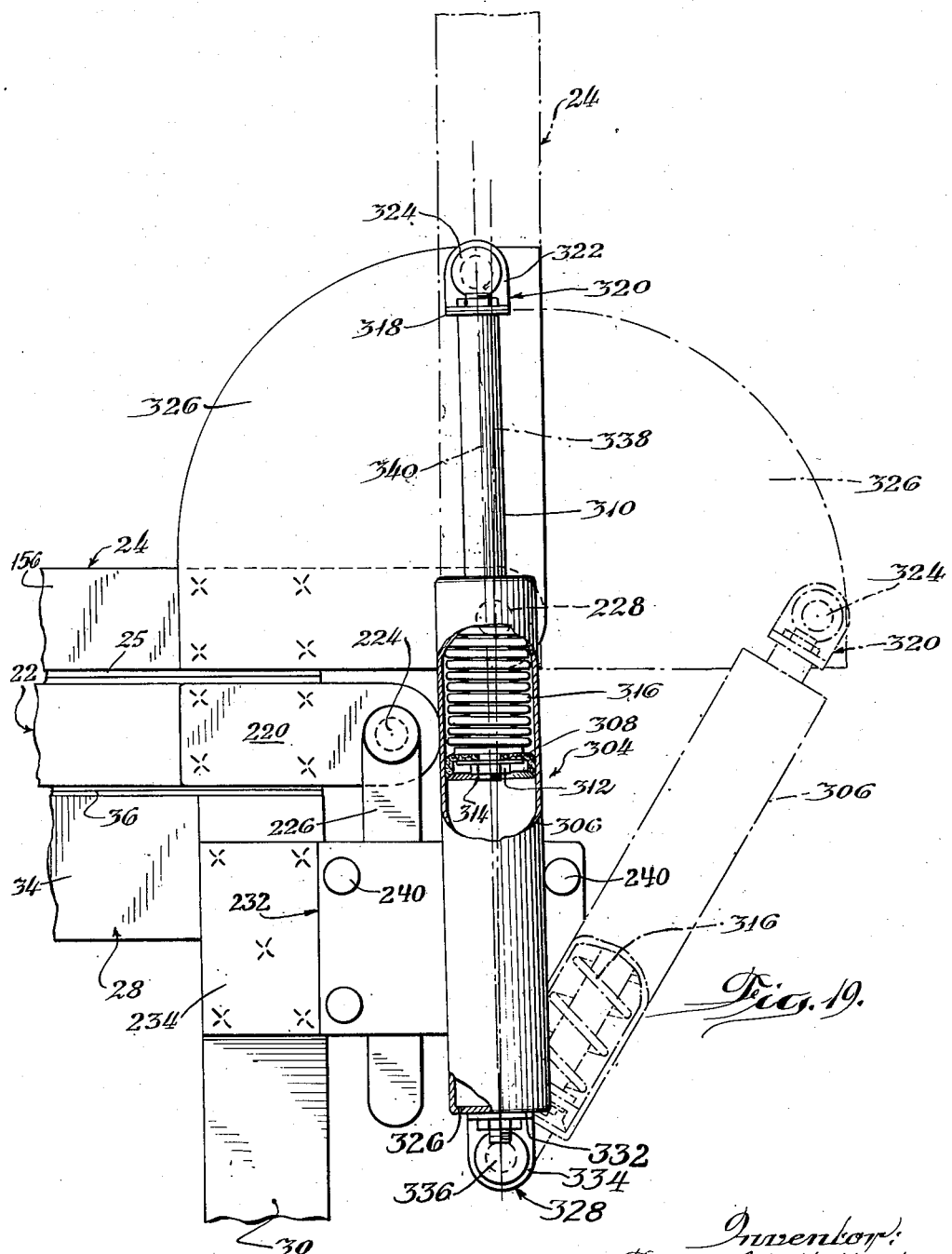

Patented Oct. 23, 1951

2,572,148

UNITED STATES PATENT OFFICE 2,572,148

PHOTOGRAPHIC PRINT DRYING AND MOUNTING APPARATUS

Dwight H. Hester, Chicago, Ill.

Application July 29, 1949, Serial No. 107,594

29 Claims. (Cl. 34—144)

The present invention relates to an apparatus or press for drying and mounting photographic prints. This invention is an improvement over the apparatus disclosed and claimed in my copending application, Serial No. 608,630, filed August 3, 1945, for an invention entitled "Photographic Print Drying and Mounting Apparatus," Patent No. 2,477,603, dated August 2, 1949.

The principal object of this invention is to provide an improved apparatus adapted both for drying photographic prints and for dry mounting such prints.

Another object is the provision of an improved apparatus which smooths and flattens photographic prints while drying them under heat and pressure.

Another object is to provide an improved apparatus having greatly increased capacity for drying and dry mounting photographic prints.

Another object is to provide an improved apparatus for drying and dry mounting photographic prints under heat and pressure which includes means for applying the pressure uniformly through the pressing parts of the apparatus.

A further object is to provide an improved apparatus for drying and dry mounting photographic prints which includes improved means for compensating for the thickness of the print or the mounting, or both.

Still another object is to provide an improved apparatus for drying and dry mounting photographic prints which includes a means for regulating the pressure applied to the prints or mountings regardless of their thicknesses.

Still another object is to provide an improved apparatus for subjecting photographic prints and mounts to heat and pressure in which a heating plate of two sections is provided, permitting movement of one section into print-engaging and holding position ahead of the other, thus eliminating special holding means and affording greater ease of operation.

Another object is to provide an apparatus for drying and dry mounting photographic prints which incorporates an improved positive action locking device to lock the apparatus in drying or dry mounting position.

A still further object is to provide an appaartus for drying and dry mounting photographic prints having an improved pivotal mounting for a movable frame part and a heating plate which also incorporates a means whereby the movable frame is automatically swung out of the way when released.

A further object is to provide an apparatus for drying and dry mounting photographic prints having a novel, adjustable pivotal mounting for the movable parts.

A further object is to provide an improved apparatus for drying and dry mounting photographic prints having a novel pivot mechanism of the over dead center type which makes substantially effortless the turning of the movable parts to pressing position and holding them there until the locking mechanism is actuated to locking position.

A further object is to provide an improved apparatus for drying and dry mounting photographic prints which is sturdy in construction, having a few parts subject to wear.

Other objects and advantages will become apparent from the following description taken in conjunction with the accompanying drawings wherein:

Fig. 1 is a side elevational view of my improved photographic print drying and dry mounting apparatus with the parts locked in pressing position;

Fig. 2 is a front elevational view, taken from the left side of Fig. 1;

Fig. 3 is a top plan view of the apparatus shown in Fig. 1;

Fig. 4 is a side elevational view on a somewhat smaller scale illustrating different positions to which the top frame and the heating element or plate may be moved;

Fig. 5 is an enlarged cross-sectional view, with some parts in elevation, illustrating details of construction of the locking mechanism and may be considered as taken along the line 5—5 of Fig. 3, looking in the direction of the arrows;

Fig. 6 is an enlarged fragmentary elevational view of the locking mechanism viewed from the same position as Fig. 1;

Fig. 7 is a detail cross-sectional view illustrating the construction of the connection between the pressure bar and the top frame, and is taken on the same plane as Fig. 5 but illustrates some of the parts in elevation rather than in section;

Fig. 8 is an enlarged elevational view of the pivotal mountings for the top frame and the heating plate or element;

Fig. 9 is a fragmentary cross-sectional view taken on line 9—9 of Fig. 8 looking in the direction of the arrows;

Fig. 10 is a fragmentary partially elevational and partially cross-sectional view of the front portion of the heating plate or element illustrating details of construction;

Fig. 11 is a fragmentary front elevational view of a modified form of the apparatus which incorporates additional means for compensating for the thickness of the material being dried or dry mounted;

Fig. 12 is a view similar to Fig. 11 illustrating the parts in changed position;

Fig. 13 is a cross-sectional view on a greatly enlarged scale taken on the line 13—13 of Fig. 11, looking in the direction of the arrows;

Fig. 14 is an enlarged fragmentary cross-sectional view illustrating details of construction of the compensating means of Fig. 11;

Fig. 15 is an enlarged fragmentary elevational view with certain parts in cross-section illustrating a modified form of pivotal mountings for the top frame and heating plate or element;

Fig. 16 is a cross-sectional view taken on the line 16—16 of Fig. 15, looking in the direction of the arrows;

Fig. 17 is a cross-sectional view taken on the line 17—17 of Fig. 16, looking in the direction of the arrows;

Fig. 18 is a cross-sectional view taken on the line 18—18 of Fig. 16, looking in the direction of the arrows; and Fig. 19 is an enlarged fragmentary elevational view with certain parts in cross-section illustrating a further modified form of pivotal mounting for the top frame and heating element and including means for moving the top frame to open or non-pressing position.

Referring primarily to Figs. 1 to 4 inclusive, it will be seen that my improved apparatus comprises generally a base 20, a heating plate 22 pivotally mounted to the base, a top or pressure frame 24 overlying the heating plate and likewise pivotally mounted to the base, and a locking and pressure producing mechanism 26 for maintaining the heating plate and top frame in the position shown in Fig. 1 and for applying pressure to the plate and top frame.

The base 20 comprises a rectangular frame member 28 mounted upon legs 30 which are welded thereto. The frame 28 is provided with suitable longitudinal and transverse stiffening members 32 having attaching flanges at their ends which are spot welded to a peripheral frame 34. A perforated or foraminous steel bed plate 36 of a thickness about 20 gauge covers the top of the frame 28 and has its peripheral flanged edge spot welded thereto. This bed plate serves as the surface upon which the prints or mounts are laid and held beneath the divided heating plate 22. A similar perforated steel plate 25 is spot welded to the lower side of the top frame 24 and prints or mounts are held between the plates 25 and the top of the heating plate 22.

The frame 28 is provided with a pair of relatively heavy transverse, parallel stiffening members 38 which are equidistantly spaced from the center line of the frame but are arranged relatively close thereto (Figs. 2 and 5). To these parallel members 38 is welded a pair of depending bearing plates 40 fixedly supporting sleeve bearings 42 in which are journaled the inner ends of rock shafts 44. The outer end of each rock shaft 44 is journaled in a sleeve bearing 46 which is fixedly secured in a depending bearing plate 48 welded or otherwise suitably secured to the peripheral frame 34. At the inner end of each rock shaft 44 is fixedly secured an arm 50; the arms 50 are parallel and arranged between the transverse stiffening members 38 and extend upwardly and rearwardly from the shafts 44. Each arm 50 is welded to a sleeve 52 secured to the rock shaft 44 by a tapered pin or key 54 driven through the shaft and the sleeve. At their outer extremities the arms 50 are interconnected by a rod or bar 56 secured thereto. A tensioned biasing spring 58 interconnects the bar 56 and a hook 60 welded to the inside of the front of the peripheral frame 34. The spring 58 biases the arms 50 in a counterclockwise direction (Figs. 1 and 4) and tends to hold them in their extreme over dead center positions, the dead center being the axis of rotation of the rock shafts 44; the two extreme positions are illustrated in Fig. 4 wherein the top frame 24 and the heating element 22 are in open position.

The heating plate 22 comprises a front portion 62 and a rear portion 64 which is rotatable about a pivot pin 66 carried in the upper end of a vertically movable bar 68. The front portion 62 is connected to the rear portion 64 by a pivot pin 70 carried in a pair of bearing plates 72, 74 secured to the front and rear portions of the heating plate, respectively, and at both sides thereof (Fig. 3). As seen in Figs. 1, 3 and 10, the bearing plates 72 and 74 are secured to the sides of the heating plate portions and overlap so that the pivot pin 70 can extend through and be journaled in coinciding openings or holes 76 in these plates. The center line of the pin 70 is immediately above the parting line between the portions 62 and 64 so that there will be no interference with the free pivoting of the portion 62 relative to the portion 64. The amount of relative pivotal movement in a clockwise direction (Fig. 1) between the portions 62 and 64 is limited by hook-like extensions 78 on the rear edges of the plates 72 which are engageable with pins 80 outwardly projecting from the portion 64 or plates 74. Thus as the heating plate portion 62 is moved in a clockwise direction about the pivot 70 (Fig. 1) the hook-like projections contact the pins 80 and terminate the relative clockwise movement. The full extent of this movement is shown in Fig. 4 wherein the hooks 78 are in engagement with the pins 80.

A preferred form of construction for each of the heating plate portions 62 and 64 is illustrated in Fig. 10 which is an elevational view with parts in section of the front portion 62 of the heating plate 22. Fig. 10 shows that the portion comprises a side wall structure 82 to which a flat perforated bottom plate 84 is welded, brazed or otherwise suitably secured. A top perforated plate 86 is removably secured to the side wall structure 82 by means of a plurality of resilient members 88 which have their inner ends fixedly secured by any suitable means, such as by spot welding, to the inner and under side of the plate 86. Each resilient member has its outer spring finger end 90 formed with a rounded outwardly-projecting portion 92 adapted to engage in short slot or opening 94 in the wall structure 82. The plate 86 is removable so that ready access may be had to the heating element (not shown) without the necessity of removing the heating plate portions 62 and 64 from the apparatus.

The heating element which may be of any suitable type but is preferably of the resistance wire type, embedded in a ceramic, is mounted in the interior of the compartment formed by the wall structure 82 and the top and bottom plates 84 and 86 in some suitable fashion and is positioned so that it is closer to the bottom of the plate portion than to the top. The heating element is in two series connected sections with one section in each of the plate portions 62 and 64. The series connection is made by a short insulated and preferably reinforced connector 85 extending between the portions 62 and 64 across the hinge or pivot pin assembly (Fig. 1).

Electric power is supplied to the heating element through the electrical connectors 87 projecting outwardly from the plate portion 64 so as to be engageable with a complementary electrical connector. The temperature of the heating plate may be adjusted by means of a variable resistance controlled by a manually operable knob 89.

It is preferred that the top and bottom plates 86 and 84 be perforated or foraminous as shown in Fig. 10 rather than be of the imperforate or solid type, because experience has shown that an imperforate plate becomes exceedingly hot in use and expands tending to bulge and buckle, thereby no longer presenting an even and flat surface against which the photographic prints may be dried or against which the mounts for the photographs may be pressed in a dry mounting operation.

As seen in Fig. 10, the side bearing plates 72 are secured to the wall structure 82 by means of rivets 96. The bearing plates 74 may be similarly secured to the plate portion 64.

The heating plate 22 is moved from its flat position as seen in Fig. 1 to its open and retracted position as shown in full lines in Fig. 4 by a pair of arms 98 secured to and rotatable with the rock shafts 44 through the intermediary of generally triangularly shaped plates 100 arranged at either side of the apparatus. The arms 98, which may either be interconnected across the front of the apparatus or may be provided with sidewardly and outwardly extending handles (not shown), are arranged to engage a pair of rollers 102 pivotally mounted on and carried by the front portion 62 of the heating plate 22. Each roller 102 actually is mounted upon that portion of the bearing plate 72 which is riveted to the side wall structure 82 of the portion 62 and pivots freely about a stubshaft 104. Spacers 105 space the rollers 102 outwardly from the heating plate portion 62 so as to be engageable by the arms 98.

As the arms 98 move or are moved upwardly in a clockwise direction (Figs. 1 and 4), the outer end of an inner short straight portion 106 contacts the roller 102 which rides up through an S shaped bend 108 and then onto an outer straight portion 110. It will be observed from Fig. 4 that the portion 110 is inclined or arranged at an angle relative to the short straight portion 106 and that when the apparatus is in its fully open position the portion 106 extends substantially vertically, but that the portion 110 while extending in a generally vertical direction also is inclined rearwardly at an angle of approximately 20° to the vertical and to the portion 106. This arrangement prevents the weight of the heating plate 22 in the full line position shown in Fig. 4 from overcoming the force exerted by the biasing spring 58, so that the heating plate will remain in the full line position, permitting the insertion of photographs or mounts on the bottom frame 28 beneath the rear heating plate portion 64 without danger of burning to the operator.

Each arm 98 is secured to its associated triangular plate 100 by means of a short stub shaft 112 which has one end fitted into the hollow arm 98 and secured therein by means of a screw 114 and its opposite end 116 bifurcated so as to slide over the triangular plate 100 adjacent one point thereof; the bifurcated end 116 is welded to the plate 100 at 118. Thus each plate 100 and its associated arm 98 is a rigid assembly and moves with the rock shaft 44.

Each plate 100, as seen in Fig. 5, is secured adjacent another point thereof to a sleeve 120 by welding or other suitable means. The sleeve 120 is rigidly secured upon the outer end of the shaft 44, projecting beyond the bearing 46, by means of a tapered pin or key 122 driven through the sleeve 120 and the shaft 44.

Adjacent the third and lower point of the triangular plate 100 a long bar or arm 124 is pivoted on a rivet type pivot pin 126. This arm extends upwardly across and beyond the face of the plate 100 being approximately twice as long as the longest edge of the plate. Intermediate its ends it is connected to one end of a tension spring 128 which has its other end connected to the arm 98 on the straight portion 106 thereof. Opposite the pivot pin 126 the arm 124 carries a second, substantially shorter parallel arm or bar 130 which is secured thereto by a pair of spacers 132 and 134 which have their ends riveted over so that the bar 130 is securely fastened to the bar 124. The spacers 132 and 134 are in the nature of very short shafts and with the bar 130 give rigidity against twisting to the bar 124.

The spacer 134 is adapted to engage in any one of a plurality of notches 136 formed in the rear face of the lower end of a depending bar or arm 138 which forms a part of the pressing and locking mechanism 26. The upper end of the bar 138 has a rectangular opening 140 to receive the projecting tongue 142 of a pressure bar 144 which extends across the top of the top frame 24 and is operatively associated therewith so as to resist any generally upward movement of the frame 24 occasioned by the introduction between the plates of a substantial thickness of prints or mountings. It will be observed from Figs. 2 and 3 that the pressure bar extends through the slotted upper ends of four generally cylindrical guide posts; the end posts are indicated by the reference character 146 and the intermediate posts are designated by the reference character 148.

Fig. 6 clearly shows the shape of the notches 136 in the arm 138. Each notch has a generally flat lower edge terminating at its inner end in an arcuate face which blends with a slightly upwardly and outwardly inclined straight part. The pin or stud 134 is arranged to be moved into engagement with one of the notches by a counterclockwise rotation of the arms 98. Since the spring 128 interconnects the bar 124 and the arm 98 this movement is transmitted to the arm 124. If the arm 138 is in the position shown in Fig. 6 the stud or spacer 134 will engage in one of the notches 136 depending upon the thickness of the material between the elements 22, 24 and 28. Since the teeth 137 are relatively small compared to the notches 136 and since the upper edge of each notch is inclined the spacer 134 will engage in that notch closest to its path of movement.

The pressure bar 144 is guided in each of the end guide posts 146 by means of a slotted cylindrical spring pad 150 to which it is secured by means of rivets 152. If desired, the spring pads can be used in the intermediate posts 148 but this is not usually necessary. Coil springs 154 are confined between the lower face of the pressure bar 144 and the upper edge of top frame members 156. These springs 154 bias the pressure bar upwardly and away from the frame but the depending bar 138 when engaged by spacer 134 in one of the notches 136 draws the pressure bar 144 downwardly. The combination of the bar 138, pressure bar 144 and springs 154 insures that a substantially even amount of pressure is applied at all times to the frame 24 and, therefore, the prints during drying or dry mounting. To prevent the inadvertent removal of the pressure bar 144 and the associated mechanism from the top frame 24 when it is in the full line position shown in Fig. 4, caps 158 may be secured to the upper end of the guide posts 146. The caps 158 are of the snap on type, but other caps or closures may be used.

If desired, additional spring means may be positioned above the pressure bar 144 in the posts 146 together with some means regulating the downward pressure exerted by these added spring means. These latter means might take the form of a threaded shaft or bolt screwed into the upper end of the posts 146 which would be threaded so as to regulate the pressure upon the additional springs and upon the springs 154.

The engagement of the spacer 134 in a notch 136 will hold the apparatus in pressing position as shown in Fig. 1 with the heating plate 22 and top frame 24 in horizontal position. The spacer 134 is disengaged to release these elements by rotating the arms 98 clockwise so that a pin 160 carried by the triangular plate 100 adjacent that corner to which the arm 98 is secured contacts the arm 124 intermediate its pivot point 126 and the spacer 132. The engagement of the pin 160 with the bar 124 is shown in full lines in Fig. 4 but occurs before the arms 98 engage the rollers 102. After the pin 160 has struck the bar 124 and the arms 98 are further moved in the clockwise direction, the spacer 134 will be disengaged from the notch 136 since it is carried at the outer end of the arm 124. As soon as the spacer has been released from the depending bar 138, a spring biasing mechanism 160 at the rear of the apparatus will immediately move the frame 24 from its horizontal position to its nonoperating or open position as seen in full lines in Fig. 4.

The spring biasing mechanism 160 is best shown in Fig. 8 and comprises a spiral clock type spring 162 which has its outer end secured to a pin 164 on a vertical and vertically movable bar 166. Its inner end is secured to a stub shaft 168 to which the frame 24 is welded or otherwise secured. The stub shaft 168 is pivotally journaled in the upper end of the vertical bar 166 and is provided with a nut 170 on its outer end. As seen in Fig. 9, the spring 162 is retained between a pair of plates or discs 172 rotatably mounted on the shaft 168 and in engagement with shoulders 174 so as to provide a clear space therebetween in which the spring 162 is confined. The outer plate 172 is held in place by the nut 170.

The frame 24 is provided with rearwardly extending lugs 176 which are spot welded or otherwise suitably secured to the side plates 156 and which are welded to the shaft 168 so that counterclockwise rotational movement of the shaft winds the spiral spring 162.

In order to prevent the watch spring from unwinding too rapidly and thus "slamming" the top frame 24 to its vertical position as seen in Fig. 4, a dashpot 178 is connected so as to have one and its lower end pivotally connected at 180 to the lower end of the vertically movable bar 166 and its upper end 182 pivotally connected to the lugs or ears 176.

The vertically movable bars 68 and 166 are restrained against side or twisting movement in substantially square guides 184 which are in turn fixedly secured as by welding to rearwardly extending plates 186 which are welded or riveted to the legs 30. In order to prevent the bars 68 and 166 from moving downwardly and thus lowering the pivots 66 and 168 beyond predetermined points, each bar is provided with a position limiting pin 186 extending therethrough and beyond the sides thereof in a drive fit so as to be engageable with the top edge of the guides 184. In this way the bars may move upwardly from their lowest positions (Figs. 1 and 8) but may not move downwardly from that position.

When a substantial thickness of material is placed between the base or lower frame 34 and the heating element 22, or between the element 22 and the top frame 24, the pivots 66 and 168 will move vertically as the bars 68 and 166 slide upwardly vertically in their guides 184 to compensate for the thickness of the material.

Because the top frame 24 does not return to horizontal position of its own accord or of its own weight, a forwardly extending rod 188 is secured to the front of the frame and is provided with a comfortable spherical knob 190 screwed onto the threaded outer end 192 of the rod 188.

While the operation of this photographic print drying and dry mounting apparatus or press might be apparent from the foregoing description of its construction and the description of the operation of some of the subcombinations, a better understanding of its advantages can be had if a summary of a typical drying or dry mounting operation is made at this point.

If it is assumed that the elements of the press or apparatus are in the full line position of Fig. 4, then the apparatus is in condition to receive either prints for drying or mounts to which photographic prints are desired to be affixed. For the sake of simplicity a drying operation rather than a dry mounting operation will be described.

The wet or damp prints are laid face downward on the bed plate 36 of the bottom frame 28, preferably beginning with a back row of prints laid beneath the back portion 64 of the heating plate 22. When the plate 36 has been covered with prints the arms 98 are moved downwardly in a counterclockwise direction until the front portion 62 of the heating plate rests flat upon the bed plate 36 and the lower frame 28, and therefore all of the prints which were previously laid upon the plate 36 are covered by the heating plate 22. This movement against the force of the spring 58 is assisted by the weight of the heating plate which in the apparatus illustrated is about sixty pounds. When the arms 98 have been rotated downwardly sufficiently to bring the heating plate 22 into horizontal position the bar 56 is at its dead center position. After the heating plate 22 has been lowered to its horizonal position then wet or damp prints may be placed upon the top thereof and are preferably placed face up until the top of the heating plate has been covered or at least until all of the prints that it is desired to dry have been put into the apparatus.

When this is done, then the handle 190 is grasped to lower the top or pressure frame 24 to its horizontal position in which it is to be locked with the perforated plate 25 against the face of the prints. With the bar 56 in its dead center position the bar 124 and spacer 134 will not lie in the path of movement of the depending arm 138. As pointed out previously, the counterclockwise rotation of the frame 24 to its horizontal position winds the spring 162.

With the top frame 24 manually held in horizontal position the arms 98 are moved to their lowermost position which movement is greatly implemented by the spring 58 (Fig. 1). During this movement the spring 128 draws the bar 124 in a counterclockwise direction so that the spacer 134 engages in one of the notches 136 to lock the top frame in its horizontal position. It will be observed that this movement of the bar 124 is not purely rotational but has a substantial downward component because the pivot 126 itself pivots about the center line of the rock shafts 44. When the spacer 134 has engaged one of the notches 136 it does so prior to the time the arms 98 are in their extreme lowest position and further movement of the arms in the counterclockwise direction assisted by the spring 58 draws the spacer 134 downwardly and, therefore, the pressure bar 144 downwardly against the force of the springs 154. The result is to lock the superposed pressure frame 24, heating plate 22 and base frame 28 under pressure.

In Figs. 1, 5 and 6 the spacer 134 is shown engaged in the topmost of the notches 136. This is true when the apparatus is empty or has thin prints in it. If the thickness of the print being dried is considerable or if dry mounting operations are being carried on, then the notch engaged will be one, two, three, four or more below the uppermost notch. When the thickness of the material being dried or dry mounted is considerable as indicated, the pivots 66 and 168 move upwardly to compensate for this thickness, and they do so readily since the vertical bars 68 and 166 are freely slidable in their guides 184.

With the press locked as shown in Fig. 1 the heating element current is turned on. It may of course be turned on prior to loading the press, but if this is done care must be taken not to touch the heating plate 22.

After the time for drying the prints or for a dry mounting has been completed, the apparatus is opened by moving the arms 98 in a clockwise direction sufficiently to release the locking mechanism 26. This mechanism is released by contact of the pin 160 against the bar 124 to disengage the spacer 134 from the notch 136. Immediately upon disengagement of the spacer 134 from the notch 136 the spring mechanism 160 which previously was wound by moving the top or pressure frame 24 in a counterclockwise direction will move this frame to its vertical position at a speed regulated by the dashpot 178. First the prints which were laid on top of the heating plate are removed from the press and then the arms 98 are further moved in a clockwise direction by means of the spring 58 to raise the heating plate by first rotating the front portion 62 about the pivot 70 and then by rotating both portions about the pivot 66 until they assume full line position shown in Fig. 4. Then these prints which were laid face down on the bottom plate 36 are removed. It should be noted that the apparatus is so constructed that the spring 58 will hold the heating plate 22 in any position to which it is moved and that only a slight manual effort is required to move it.

It may be desirable that the amount of pressure exerted in pressing the top or pressure frame 24 against the lower frame be varied or increased. Figs. 11 to 14 show a mechanism for increasing the pressure of the pressure bar 144 against the frame 24 so that the pressure exerted during print drying or dry mounting, and particularly during dry mounting may be regulated. In these figures, where the element corresponds exactly to the element illustrated in Figs. 1 to 10, the same reference character is used.

The pressure bar 144 is supported in the posts 146 and 148 as in the previously described embodiment. However, the springs 156 do not act directly against the lower edge of the pressure bar or against pads 150 in the posts 146. Rather, these springs act against the lower edge of long subsidiary pressure bars 194 which are pivotally carried by links 196 and 198. The links 196 are pivoted at 200 to the pressure bar 144 and the links 198 are pivoted intermediate their ends at 202 to the pressure bar 144. The distance between the pivots 200 and 202 and the bars 194 are equal so that the bars 194 will at all times be maintained in a parallel position relative to the pressure bar 144 as seen in Figs. 11 and 12.

The links 196 are arranged in pairs on opposite sides of the pressure bar 144 but the links 202 are preferably constructed as shown in Fig. 13 with bifurcated lower ends 203 and an upper solid portion 204. The upper end of each link 198 is pivoted at 206 to the bifurcated end of a threaded connector or clevis 208. Each clevis 208 is screwed onto one end of a threaded rod 210 which has its opposite end threadedly engaged in a long hub 212 of a hand wheel 214. One of the screws 210 and its associated threaded hub 212 is provided with a right hand thread while the other is provided with a left hand thread so that when the hand wheel 214 is rotated the clevises 208 are moved toward or away from each other to rotate the bifurcated links 198 about the pivots 202.

With the print drying and dry mounting apparatus illustrated in Figs. 11 and 14 the prints or mounts are placed between the heating plate 22 and the top and bottom frames and then these elements are locked together as previously described taking care, however, that the subsidiary pressure bars 194 are in their retracted position against the lower edge of the pressure bar 144 (Fig. 12). After the top frame 24 has been locked in position the hand wheel 214 is rotated to draw the links 198 toward the vertical position, thus moving the subsidiary pressure bars 194 away from the pressure bar 144 to increase the pressure applied to the prints or dry mounts. In this way the pressure exerted downwardly by the springs on the top frame 24 may be more carefully adjusted and increased without modifying the locking mechanism. The springs 154 may be omitted from the modification shown in Figs. 11 to 14, in which case the bars 194 will react directly against the top frame 24. With the apparatus in the position of Fig. 12 and the springs 154 omitted, the top frame 24 is brought to horizontal position and the locking mechanism 26 is engaged. The hand wheel 214 is rotated to swing the links 198 toward each other to move the pressure bar 144 upwardly to take up any slack which there might be in the locking mechanism. This is particularly advantageous when a very thick amount of material is placed between the elements of the press.

In Figs. 15 to 18, both inclusive, there is illustrated another form of the hinged mounting for the heating plate 22 and the top frame 24. The plate 22 is provided with rearwardly extending lugs or ears 220 and the top frame is provided with similar but slightly longer rearwardly extending lugs or ears 222. These ears 220 and 222 are respectively spot welded or otherwise permanently affixed to the heating plate 22 and the top frame 24, respectively. The heating plate 22 is pivoted by means of a pivot pin 224 to the upper end of a vertically extending and vertically adjustable bar 226, while the top frame 24 is similarly pivoted by means of a pivot pin 228 to the upper end of a vertically extending and vertically adjustable bar 230. These bars 226 and 230 are not freely slidable vertically as was the case with the mounting illustrated in Figs. 1 to 10 but may be locked in any adjusted position by means of a locking mechanism 232.

This locking mechanism, preferably duplicated at both sides of the apparatus, is mounted upon and includes a plate 234 which is welded to the rear leg 30 of the base. It also includes a front plate 236 between which is mounted a wedging means 238 by a plurality of bolts 240 and nuts 242. The wedging means 238 is most clearly seen in Fig. 17 and comprises three elements—side plates or bars 242 and a middle split bar 244. The bar 244 is centrally slotted at 246 from its upper end downwardly to a point adjacent its lower end and is provided with three equidistantly spaced substantially cylindrical openings 248, 250 and 252, which are adapted to receive a flat-headed bolt 254. As seen in Figs. 17 and 18, when this bolt is drawn up tight its tapered flat head engages in conical recesses 256 coaxial with the openings 248, 250 or 252 to spread the sides of the bar 244 away from the center thereof so as to engage both of the vertically extending bars 226 and 230 thereby to wedge them against the adjacent side bars 242 in their vertically adjusted positions. In this manner the bars 226 and 230 are snugly held and, therefore, the pivots 224 and 228 are firmly held against accidental movement. Three openings 248, 250 and 252 are provided to permit vertical adjustment of the bar 244 relative to the mounting plate 234 and the application of greater or lesser pressures against the bars 226 and 230.

The bolt 254 is tightened by means of a short threaded sleeve 258 provided with turning finger members 260. The sleeve 258 reacts against the rear face of the plate 234. If desired an ordinary wing nut may be substituted for the threaded sleeve 258.

The mechanism for locking the top or pressure frame 24 and heating plate 22 against the lower frame 28 in this modification is the same as that shown in Fig. 1 and, similarly, the mechanism for raising the heating plate 22 is the same as that shown in Fig. 1. However, the biasing mechanism for automatically moving the top frame to its vertical position is preferably as illustrated in Figs. 15 and 16.

This biasing mechanism comprises a cylinder 262 which is closed at both ends. A piston 264 of the cup washer type is slidable in the cylinder and is secured to one end of a piston rod 266 by means of a nut 268 threaded on the reduced end portion 270 of the piston rod 266. A spring 272 confined between the lower end of the cylinder 262 and the piston 264 biases the piston and thus the piston rod upwardly (Fig. 15). The piston rod extends outwardly through an opening 274 in the upper end of the cylinder 262 and has a threaded upper end 276 projecting through one ear 278 of a right angle member which has its other ear 282 pivotally mounted by means of a rivet type pivot 284 to the rearwardly extending ear 222 of the top frame 24. A nut 286 threaded onto the piston rod 276 fastens the piston rod to the angle. Any movement which is imparted to the piston rod 266 is transmitted to the member 222 and, therefore, to the top frame 24.

In order to limit the speed with which the springs 272 will move the piston 264 and, therefore, the top frame 24 upwardly, a restricting air hole 258 is provided in the upper end of the cylinder, and an air bleed regulator 290 is threaded into the lower end of the cylinder 262. This regulator includes a valve body 292 having a tapered valve stem 294 threaded thereinto. An air hole 296 formed in the side of the valve body communicates with the outlet 298 from the valve body at its inner end. A locknut 300 secures the valve 294 in any adjusted position. By adjusting the position of the tapered valve 294 in the valve body the speed with which air is admitted to the interior of the lower end of the cylinder 262 may be regulated, and thus a damping effect is imposed upon the piston 264 to limit its speed of movement by the spring 272.

The cylinder 262 is pivoted to the lower end of the bar 230 by means of a lug 302 secured to the piston 262 and a pivot pin 304 extending through the lug 302 and the bar 230. Thus when the bar 230 is moved vertically to adjust the position of the top frame relative to the heating plate 22 and to the bottom frame 28, there is no change in the relative positions of the three pivots 284, 228 and 304 and, therefore, such adjustment has no effect upon the action of the mechanism biasing the top frame 24 to its vertical position.

In this modification when the handles 98 are operated to unlock the locking mechanism 26 and to release the top frame 24, the compressed spring 272 will move the piston 264 and piston rod 266 upwardly. This movement of the piston rod moves the pivot 284 upwardly in a clockwise direction about the pivot 228, and the top frame 24 is thus moved to its vertical position. The frame 24 is returned to horizontal position manually; this return compresses the springs 272. If desired the clock spring 162 can be used with the locking mechanism 232.

In Fig. 19 there is illustrated a further modification of the means for moving the top or pressure frame 24 from its horizontal to its vertical position. The heating plate 22 and the top frame 24 are pivoted to the base by a mounting 232 similar to that shown in Figs. 15 to 18, and similar reference characters have been used in these figures to indicate similar or the same parts.

A mechanism 304 for raising the top frame 24 includes a cylinder 306 closed at its upper and lower ends in a conventional manner. A piston of the cup washer type 308 is slidable in the cylinder 306 and is secured to lower end 314 of a piston rod 310 by means of a nut 312. A spring 316 is confined between the inner face of the piston 308 and the upper end of the closed cylinder 306. The piston rod 310 extends outwardly and upwardly of the piston 306 and is fixedly secured to one ear 318 of a short angle member 320 which has its other ear 322 pivotally connected by means of a pin 324 to one corner of a quadrant plate 326. The quadrant plate 326 is secured as by welding to the rear end of the top frame 24 and is pivoted at 224 to the upper end of the vertically adjustable bar 230.

The lower end of the cylinder 306 is provided with an air bleed 326 to regulate the speed of movement of the piston 308 and is provided with a mounting angle 328 having one ear 332 bolted to the lower end of the piston and its other ear 334 secured by a pivot pin 336 to the vertical bar 230. If desired an adjustable air bleed similar to the air bleed 290 may be used.

A center line 338 is drawn vertically through the pivots 336 and 228 and a second center line 340 is drawn through the piston-cylinder combination and the pivot 324. The center line 340 lies forwardly of the center line 338; thus, when the top frame 24 is in its lower or horizontal position the spring 316 tends to hold it in that position even though the top frame 24 may be released from the locking and pressure producing mechanism 26. In order to move it to its vertical position it must be lifted manually so that the pin 324 passes over dead center to the rear of the center line 338 or an arcuate distance of approximately 10° in the clockwise direction. As soon as this short movement has been made, the spring 316 drives the piston 308 downwardly in the cylinder 306, and the top frame is moved vertically at a speed determined by the bleed 326. The changed positions of the elements are shown in phantom lines in Fig. 19.

From the foregoing it will be observed that a new and improved photographic print drying and dry mounting press or apparatus has been disclosed which attains all of the objectives claimed for it in the opening paragraphs of this specification. It will be obvious to those skilled in the art that changes and modifications may be made in this apparatus without departing from the spirit and scope of the invention which is limited only by the scope of the appended claims.

What is claimed as new and desired to be secured by United States Letters Patent is:

1. A photographic print drying and mounting apparatus comprising a base frame, a top pressure frame, a heating plate disposed between said base frame and said top pressure frame, means pivotally mounting said heating plate relative to said base frame, means pivotally mounting said top pressure frame relative to said heating plate and to said base frame, a spring mechanism acting between said top pressure frame and said base frame for biasing said top pressure frame away from said base frame and said heating plate, and a locking mechanism for holding said base frame, said heating plate and said top pressure frame in superposed position against the effect of said biasing mechanism.

2. A photographic print drying and mounting apparatus comprising a base frame, a top pressure frame, a heating plate disposed between said base frame and said top pressure frame, means pivotally mounting said heating plate relative to said base frame, means pivotally mounting said top pressure frame relative to said heating plate and to said base frame, a spring mechanism including a spiral spring having one end fixed to a part of said base frame and the other end affixed to said second pivotal mounting means for biasing said top pressure frame away from said base frame and said heating plate, and a locking mechanism for holding said base frame, said heating plate and said top pressure frame in superposed position against the effect of said biasing mechanism.

3. A photographic print drying and mounting apparatus comprising a base frame, a top pressure frame, a heating plate disposed between said base frame and said top pressure frame, means pivotally mounting said heating plate relative to said base frame, means pivotally mounting said top pressure frame relative to said heating plate and to said base frame, a spring mechanism including a spiral spring having one fixed end and one end affixed to said second pivotal mounting means for biasing said top pressure frame away from said base frame and said heating plate, a device for regulating the speed with which said pressure frame moves under the influence of said biasing mechanism, and a locking mechanism for holding said base frame, said heating plate and said top pressure frame in superposed position against the effect of said biasing mechanism.

4. A photographic print drying and mounting apparatus comprising a base frame, a pressure frame, a heating plate disposed between said base frame and said pressure frame, a first pivot for mounting said heating plate for movement relative to said base frame, a second pivot mounting said pressure frame for movement relative to said heating plate and to said base frame, a spring mechanism acting between a point on said base frame fixed relative to said second pivot and said top pressure frame for rotating said pressure frame away from said base frame and said heating plate, and a locking mechanism for holding said base frame, said heating plate and said pressure frame in superposed position.

5. A photographic print drying and mounting apparatus comprising a base frame, a pressure frame, a heating plate disposed between said base frame and said pressure frame, a first pivot for mounting said heating plate relative to said base frame, a second pivot for mounting said pressure frame for movement relative to said heating plate and to said base frame, means mounting said second pivot for movement along a straight line relative to said base, a spring mechanism connected to and acting between said mounting means and said top pressure frame for rotating said pressure frame away from said base frame and said heating plate, and a locking mechanism for holding said base frame, said heating plate and said pressure frame in superposed position.

6. A photographic print drying and mounting apparatus comprising a base frame, a pressure frame, a heating plate disposed between said base frame and said pressure frame, a first pivot for mounting said heating plate for movement relative to said base frame, a second pivot for mounting said pressure frame for movement relative to said heating plate and to said base frame, means for adjusting the position of said second pivot in a straight line relative to said base, a spring mechanism including a cylinder and a spring biased piston slidable therein connected to and acting between said means and said pressure frame for rotating said pressure frame away from said base frame and said heating plate, and a locking mechanism for holding said base frame, said heating plate and said pressure frame in superposed position.

7. A photographic print drying and mounting apparatus comprising a base frame, a pressure frame, a heating plate disposed between said base frame and said pressure frame, a first pivot for mounting said heating plate for movement relative to said base frame, a second pivot mounting said pressure frame for movement relative to said heating plate and to said base frame, means for adjusting the position of said second pivot in a straight line relative to said base, a spring mechanism including a cylinder and a spring biased piston slidable therein having a first part pivotally connected to said means and a second part pivotally connected to said pressure frame for rotating said pressure frame away from said base frame and said heating plate, and a locking mechanism for holding said base frame, said heating plate and said pressure frame in superposed position.

8. A photographic print drying and mounting apparatus comprising a base frame, a pressure frame, a heating plate disposed between said base frame and said pressure frame, a first pivot for mounting said heating plate for movement relative to said base frame, a second pivot mounting said pressure frame for movement relative to said heating plate and to said base frame, a vertically movable bar carrying said second pivot for adjusting the position of said second pivot relative to said base, a spring mechanism connected to and acting between said bar and said pressure frame for rotating said pressure frame away from said base frame and said heating plate, and a locking mechanism for holding said base frame, said heating plate and said pressure frame in superposed position.

9. A photographic print drying and mounting apparatus comprising a base frame, a pressure frame, a heating plate disposed between said base frame and said pressure frame, a first pivot for mounting said heating plate for movement relative to said base frame, a second pivot mounting said pressure frame for movement relative to said heating plate and to said base frame, a vertically movable bar carrying said second pivot for adjusting the position of said second pivot relative to said base, a spring mechanism including a cylinder and a spring biased piston slidable therein having a first part pivotally connected to said bar and a second part pivotally connected to said pressure frame for rotating said pressure frame away from said base frame and said heating plate, and a locking mechanism for holding said base frame, said heating plate and said pressure frame in superposed position.

10. A photographic print drying and mounting apparatus comprising a base frame, a top frame, a heating plate disposed between said base frame and said top frame, a first pivot for mounting said heating plate for movement relative to said base frame, a second pivot mounting said top frame for movement relative to said heating plate and to said base frame, means mounting said second pivot and movable to adjust the position of said second pivot in a straight line relative to said base, and a spring mechanism having over dead center positions connected to and acting between said mounting means and said top frame for biasing said top frame toward one position and for rotating said top pressure frame away from said base frame and said heating plate.

11. A photographic print drying and mounting apparatus comprising a base frame, a top pressure frame, a heating plate disposed between said base frame and said top pressure frame, a first pivot for mounting said heating plate for movement relative to said base frame, a second pivot mounting said top pressure frame for movement relative to said heating plate and to said base frame, a spring mechanism having two over dead center positions connected to said top pressure frame for biasing said top pressure frame toward one position and for rotating said top pressure frame away from said base frame and said heating plate, and a locking mechanism for holding said base frame, said heating plate and said top pressure frame in superposed position.

12. A photographic print drying and mounting apparatus comprising a base frame, a top frame, a heating plate disposed between said base frame and said top frame, a first pivot mounting said heating plate for movement relative to said base frame, a second pivot mounting said top frame for movement relative to said heating plate and to said base frame, means carrying said second pivot to adjust its position relative to said base frame, a cylinder pivotally connected to said means, a piston slidable in said cylinder, a piston rod connected to said piston and pivotally connected to said top frame, said last named pivotal connection having a pair of over dead center positions relative to said second pivot, and a spring contained within said cylinder and biasing said piston to move said pivotal connection to one of its over dead center positions.

13. A photographic print drying and mounting apparatus comprising a base frame, a top frame, a heating plate disposed between said base frame and said top frame, means pivotally mounting said heating plate relative to said base frame, means pivotally mounting said top frame relative to said heating plate and said base frame, and means mounting both said pivotal mounting means and movable to adjust both said pivotal mounting means in a straight line relative to said base frame to compensate for the thickness of material placed between said base frame and said heating plate and between said heating plate and said top frame.

14. A photographic print drying and mounting apparatus comprising a base frame, a top frame, a heating plate disposed between said base frame and said top frame, a first pivot for mounting said heating plate for rotational movement relative to said base frame, a second pivot for mounting said top frame for rotational movement relative to said heating plate and said base frame, a pair of vertically movable bars carrying said pivots, and guide means for said bars whereby both or one of said pivots may be adjusted relative to said base frame to compensate for the thickness of material placed between said base frame and said heating plate and between said heating plate and said top frame.

15. The combination set forth in claim 14 including means interposed between said bars and said guide means for limiting the vertical movement of said bars in one direction.

16. A photographic print drying and mounting apparatus comprising a base frame, a top frame, a heating plate disposed between said base frame and said top frame, a first pivot for mounting said heating plate for rotational movement relative to said base frame, a second pivot for mounting said top frame for rotational movement relative to said heating plate and said base frame, a pair of vertically adjustable bars carrying said pivots and a device for locking said bars against movement from their adjusted positions, whereby both or one of said pivots may be adjusted relative to said base frame to compensate for the thickness of material placed between said base frame and said heating plate and said heating plate and said top frame.

17. A photographic print drying and mounting apparatus comprising a base frame, a top frame, a heating plate disposed between said base frame and said top frame, a first pivot for mounting said heating plate for rotational movement relative to said base frame, a second pivot for mounting said top frame for rotational movement relative to said heating plate and said base frame, a pair of vertically adjustable bars carrying said pivots, and a wedging means engageable with said bars for locking them against movement from their adjusted positions, whereby both or one of said pivots may be adjusted relative to said base frame to compensate for the thickness of material placed between said base frame and said heating plate and said heating plate and said top frame.

18. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, and means including a pressure bar carried by said pressure frame, an element secured to said pressure bar and possessing a plurality of positioned engaging means and a member pivotally mounted relative to said base frame for engagement with said element at any selected one of said plurality of positions for holding said pressure frame, said heating plate and said base frame in superposed position and for applying pressure thereto.

19. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, and means including a pressure bar having a plurality of notches formed therein carried by said pressure frame and a member pivotally mounted relative to said base frame for engagement with said pressure bar in any selected one of said plurality of notches for holding said top pressure frame, said heating plate and said base frame in superposed position and for applying pressure thereto.

20. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, spring loaded means for moving said pressure plate away from said heating plate, and means including a pressure bar having a plurality of notches formed therein carried by said pressure frame and a member pivotally mounted relative to said base frame for engagement with said pressure bar in any selected one of said plurality of notches for holding said pressure frame, said heating plate and said base frame in superposed position and for applying pressure thereto.

21. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heater plate and to said base frame, a pressure bar having a plurality of notches formed therein carried by said pressure frame, a first member pivotally mounted relative to said base frame, and a second member pivotally carried by said first member and adapted to engage in any selected one of said plurality of notches for holding said pressure frame, said heating plate and said base frame in superposed position and for applying pressure thereto.

22. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar having a plurality of notches formed therein carried by said pressure frame, a first member pivotally mounted relative to said base frame, a second member pivotally carried by said first member and adapted to engage in any selected one of said plurality of notches for holding said pressure frame, said heating plate and said base frame in superposed position and for applying pressure thereto, and a spring means for holding said second member in notch engaging position.

23. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar carried by said pressure frame, said pressure bar having a notched member affixed thereto a first member pivotally mounted relative to said base frame, a second member pivotally mounted on said first member and adapted to engage said notched member, movable means for rotating said members so that said second member engages said notched member and then moves said notched member and said pressure bar to apply pressure to said pressure frame and said heating plate in superposed position, spring means associated with said movable means and said first member for moving said second member into notch engaging position and applying pressure to said pressure bar through said members, a third member actuated by said movable means and engageable with said second member to release said second member from said notched member, and spring loaded means for moving said pressure frame away from said heating plate and said base frame.

24. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar carried by said pressure frame, means rotatable relative to said base frame engageable with said pressure bar for applying pressure to said base frame, said pressure plate and said heating plate when said last named elements are in superposed position, and means carried by said pressure bar for increasing the pressure applied to said pressure frame, said heating plate and said base frame.

25. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar carried by said pressure frame, means rotatable relative to said base frame for and engageable with said pressure bar for applying pressure to said base frame, said pressure plate and said heating plate when said last named elements are in superposed position, longitudinal members pivotally carried by said pressure bar in parallel relation thereto, resilient means positioned between said members and said pressure frame, and means for moving said members away from said pressure bar and toward said pressure frame for increasing the pressure applied to said pressure frame, said heating plate and said base frame.

26. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar having a plurality of notches formed therein carried by said pressure frame, a first member pivotally mounted relative to said base frame, a second member pivotally carried by said first member and adapted to engage in any selected one of said plurality of notches for holding said pressure frame, said heating plate and said base frame in superposed position and for applying pressure thereto, spring means for holding said second member in its notch engaging position, movable means connected to said first member for pivoting said first member to bring said second member into notch engaging position and for engagement with a part of said heating plate for moving said heating plate into and out of superposed position relative to said base frame, and a spring mechanism cooperatively associated with said first member and said movable means and having a pair of over dead center positions for moving said movable means to and holding it in one position wherein said heating plate has been moved away from said base frame and in another position for applying pressure to said pressure bar.

27. A photographic print drying and mounting apparatus comprising a base frame, a pressure frame, a heating plate disposed between said base frame and said pressure frame, means pivotally mounting said heating plate for movement relative to said base frame, means pivotally mounting said pressure frame for movement relative to said heating plate and to said base frame, a pressure bar having a plurality of notches formed therein carried by said pressure frame, a first member pivotally mounted relative to said base frame, a second member pivotally carried by said first member and adapted to engage in any selected one of said plurality of notches for holding said pressure frame, said heating plate and said base frame in superposed position and for applying pressure thereto, an arm connected to said first member for pivoting said first member to bring said second member into notch engaging position and for engagement with a part of said heating plate for moving said heating plate into and out of superposed position relative to said base frame, and a spring mechanism cooperatively associated with said first member and said arm and having a pair of over dead center positions for moving said arm to and holding it in one position wherein said heating plate has been moved away from said base frame and in another position for applying pressure to said pressure bar through said first and second members.

28. A photographic print drying and mounting apparatus comprising a base frame, a top frame, a heating plate disposed between said base frame and said top frame, means pivotally mounting said heating plate for movement relative to said base frame, means pivotally mounting said top frame for movement relative to said heating plate and said base frame, said heating plate comprising a pair of sections, means pivotally connecting said sections and limiting the relative pivotal movement therebetween, means engageable with a part of one of said sections and pivotally mounted relative to said base for pivotally moving said one section relative to said other section and then both sections relative to said base frame in the direction away from said base frame, and spring means operatively associated with said last named means and implementing movement of said heating plate in the said direction.

29. A photographic print drying and mounting apparatus comprising a base frame, a top frame, a heating plate disposed between said base frame and said top frame, means pivotally mounting said heating plate for movement relative to said base frame, means pivotally mounting said top frame for movement relative to said heating plate and to said base frame, said heating plate comprising a pair of sections, means pivotally connecting said sections and limiting the relative pivotal movement therebetween, said means including a pair of overlapping plates carried respectively by said sections, a pivot pin extending through both said plates and having its axis lying substantially in the parting plane between said sections, a stop carried by one of said sections, and a hook-like projection formed on the plate carried by the other of said sections and adapted to engage said stop when one of said sections is pivoted relative to the other section, and movable means engageable with a part of one of said sections to swing said last mentioned section relative to the other section and then to swing both sections in a direction away from said base frame.

DWIGHT H. HESTER.

REFERENCES CITED

The following references are of record in the file of this patent:

UNITED STATES PATENTS

| Number | Name | Date |
|---|---|---|
| 1,859,004 | Reich | May 17, 1932 |
| 1,866,874 | Barnes et al. | July 12, 1932 |
| 1,910,294 | Kaminski | May 23, 1933 |
| 2,290,259 | Vose | July 21, 1942 |
| 2,477,603 | Hester | Aug. 2, 1949 |